Figure 1:
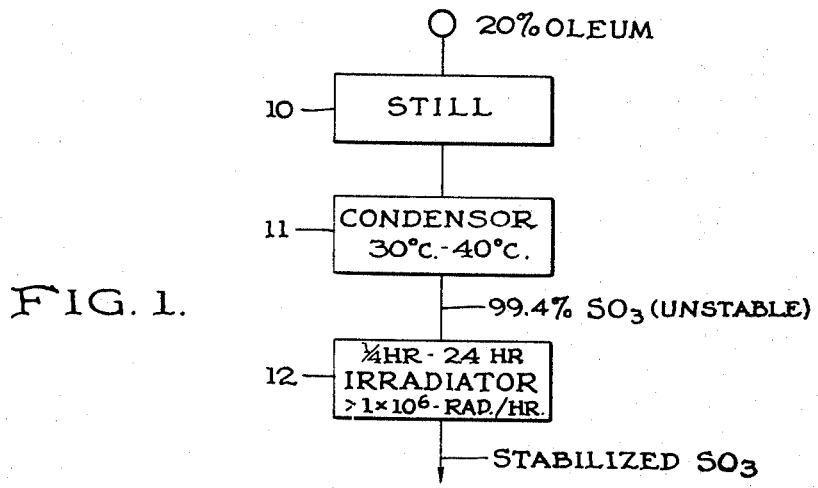

July 23, 1968  J. J. WIMBERLY  3,394,065

STABILIZATION OF SULFUR TRIOXIDE BY HIGH ENERGY RADIATION

Filed Sept. 17, 1964

INVENTOR
JOSEPH J. WIMBERLY

BY Cameron, Kerkam & Sutton
ATTORNEYS

United States Patent Office 3,394,065
Patented July 23, 1968

3,394,065
STABILIZATION OF SULFUR TRIOXIDE BY HIGH ENERGY RADIATION
Joseph J. Wimberly, College Park, Ga., assignor to Tennessee Corporation, New York, N.Y., a corporation of Delaware
Filed Sept. 17, 1964, Ser. No. 397,105
16 Claims. (Cl. 204—157.1)

This invention relates generally to the treatment of liquid sulfur trioxide and high strength oleums, and more particularly to the stabilization of liquid sulfur trioxide and high strength oleums by radiation.

Sulfur trioxide is in demand for various industrial processes, but it is impractical to employ sulfur trioxide without stabilization, because of the difficulties encountered in storing and handling. A solution of sulfur trioxide in an anhydrous sulfuric acid is commercially available as oleum.

Sulfur trioxide ($SO_3$) can exist in several allotropic forms; however, their relationships are still not completely understood. Gamma-sulfur trioxide ($\gamma=SO_3$) is trimeric and resembles ice in appearance. Its equilibrium melting point is 16.8° C. Beta-sulfur trioxide ($\beta=SO_3$) is an asbestos-like polymeric substance in which the $SO_3$ groups are linked in long chains. Its equilibrium melting point is 32.5° C. Alpha-sulfur trioxide ($\alpha=SO_3$) is also an asbestos-like solid which is similar to the beta form except that the $SO_3$ chains are also joined in a layer type of structure. Its equilibrium melting point is 62.3° C.

The gamma and beta forms are metastable with respect to the alpha form, and conversion to the alpha form is catalyzed by traces of moisture. However, this conversion to a polymeric form may be inhibited by sulfur, tellurium, carbon tetrachloride, and phosphorus oxytrichloride, which are used in commercially available stabilized forms of sulfur trioxide.

Liquid sulfur trioxide readily freezes and polymerizes to a mixture of the allotropic forms, even at room temperature, and apparently exists as an equilibrium system between monomeric and trimeric sulfur trioxide. Such polymerization creates difficult handling and storage problems. At room temperature (i.e., 27° C.) or below, for example, liquid sulfur trioxide containing small traces of moisture will polymerize and form a mixture which may be in the state of a liquid containing various solid polymers in suspension, or in the sttae of a solid mixture which must be heated to a high temperature, for example, 40° C. to 90° C., in order to reliquefy it. On storage for any length of time, moreover, the sulfur trioxide polymerizes to a solid form which tends to sublime rather than to melt on heating, with the consequent risk of building up excessive pressure.

Heretofore, it has been propsed to prevent or inhibit polymerization of liquid sulfur trioxide by the addition of various chemical stabilizing agents so as to avoid the difficulties in handling and storage resulting from polymerization. Compounds such as boron trioxide, methyl borate, and boron trifluoride dimethyl etherate have been incorporated in the product to obtain stability and have met with some degree of success. However, such methods have the disadvantage of increasing the production costs of the product due to the cost of the chemicals and the control techniques which must be utilized due to the extreme reactive nature of the sulfur trioxide.

I have found that the need for a chemical stabilizer may be eliminated, and stabilization may be achieved by a completely new stabilizing technology which relies on subjecting substantially anhydrous sulfur trioxide to ionizing or high energy radiation.

Accordingly, it is a primary object of the present invention to overcome the disadvantages of prior art methods for stabilization of sulfur trioxide.

Another object of the present invention is to obviate the need for the use of chemical stabilizers in the stabilization of sulfur trioxide.

A further object of the present invention is to provide a new method for the stabilization of liquid sulfur trioxide to avoid difficulties in handling and storage resulting from the polymerization of liquid sulfur trioxide.

These and other objects of the present invention will appear from the following detailed description of the invention taken in connection with the accompanying drawing, which description concludes with claims particularly pointing out and distinctly claiming the subject matter of the present invention.

Figure 2:
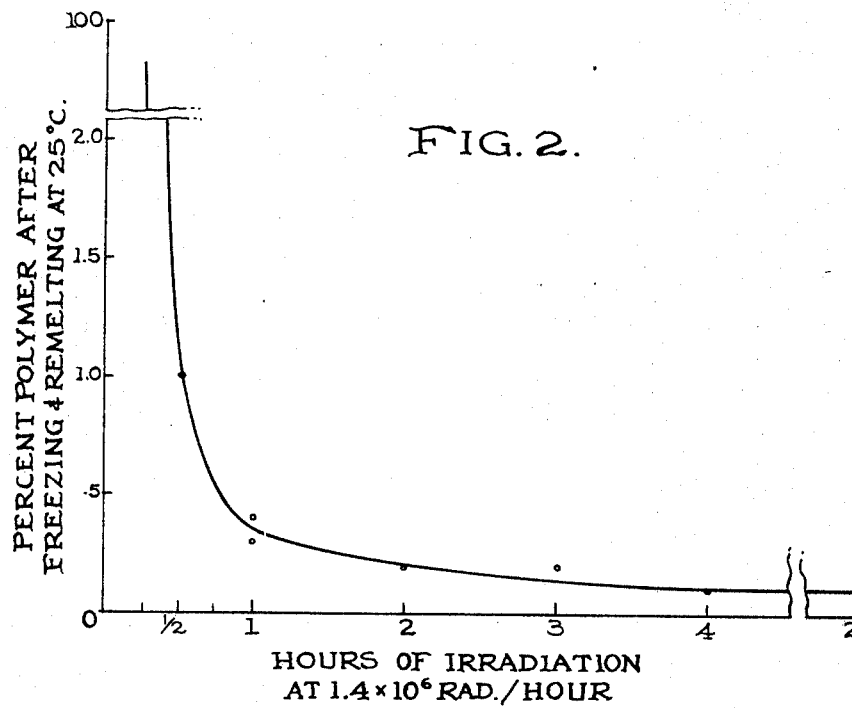

In the drawing:
FIG. 1 is a flow diagram of one form of the present invention, and
FIG. 2 is a graph illustrating the effect of irradiation of liquid sulfur trioxide for varying lengths of time at a dose rate of $1.4 \times 10^6$ rad/hour; however, other dose rates could be used.

In carrying out the present invention, in one illustrative embodiment thereof, liquid sulfur trioxide is subjected to radiation, preferably of the electromagnetic type such as, for example, gamma radiation. However, other forms of electromagnetic radiation as well as particulate radiation may also be used to effect stabilization. The gamma and beta radiation are advantageous in that no residual radioactive components are left in the material treated and, therefore, give an absolutely safe product. By subjecting the liquid sulfur trioxide to gamma radiation, the sulfur trioxide is stabilized against polymerization to its higher melting and sometimes difficult to melt forms so that it will remain liquid at room temperature. If solidified at a lower temperature, it can readily be reliquefied by being brought back to room temperature. Also, the gamma radiation markedly lowers the temperature at which the liquid sulfur dioxide solidifies.

In accordance with the present invention, with reference to FIG. 1, the liquid sulfur trioxide to be stabilized should be substantially free from moisture. Such a liquid sulfur trioxide may be obtained from the distillation of 20% oleum in any suitable distilling apparatus 10. However other strength oleums may be used, and the liquid $SO_3$ may be prepared other than from oleums. The distilled product is condensed at temperatures of 30° C. to 40° C. in condenser 11. The resulting product, which contains less than 0.1% water or its equivalent of 0.56% sulfuric acid and hence contains 99.4% or more $SO_3$ by weight, is then irradiated in a suitable irradiator 12 to effect stabilization.

Liquid sulfur trioxide having a similarly low moisture content can also be produced directly from a gas phase, and/or by use of suitable drying procedures. The liquid sulfur dioxide which is subjected to the drying procedures may be prepared by any of the known methods such as the catalytic oxidation of sulfur dioxide at 400° C. to 665° C. with a catalyst of vanadium or platinum or by the reaction between sulfur dioxide and ozone ($O_3$) at room temperature.

While a complete theoretical explanation of what takes place when a substantially anhydrous unstabilized liquid sulfur trioxide or a substantially free-from-moisture unstabilized liquid sulfur trioxide is exposed to radiation cannot be given, the stabilization of the liquid sulfur trioxide appears to indicate that changes in certain properties have taken place giving a more stable product.

Radiation energy used for the effective treatment of various materials can be conveniently classified into two groups, particulate energy (beta rays and electron beams)

and electromagnetic energy (X-rays and gamma rays). In developing the present invention, I have found that electromagnetic radiation of the gamma type can advantageously be utilized, because of its highly penetrative powers and the fact that it leaves no residual radioactive components in the treated material. One source of radiation suitable to effect stabilization is cesium–137 which is classified as both a beta and a gamma emitter.

It is known that the absorption by matter of beta rays or electrons results in the production of X-rays which also interact with the matter. While the interaction of beta rays and electrons with the molecules and atoms of matter may be different in nature from the interaction of X-rays and gamma rays, in both cases the energy of the incoming radiation is given up to the absorbing material and the over-all result is much the same in both cases. Thus, it is evident that stabilization can be achieved through either the use of a particulate energy source or an electromagnetic energy source.

In the case of particulate energy, such as beta rays and electron beams, there is a definite limit of penetration into a given material for any given energy level. Since electromagnetic radiation is absorbed in matter in a random fashion, there is no finite limit to the depth to which the radiation penetrates the matter and the amount of absorption is directly related to the penetration. Because all electromagnetic radiation travels at the same speed in any given material, the energy of different radiations will depend on the mode of generation, and the total dose given to any given material is a function of both the intensity of the beam and the energy of the rays that make it up. Accordingly, by varying the period of the radiation, or the intensity of the energy of the incoming radiation, the total dose may be increased. In all cases, the energy of the incoming beam is given up to the absorbing material. This absorption of energy is believed to result in the production of free chemical radicals and/or the breakage of chemical bonds which in some way changes certain properties and gives a more stable product.

The common available radioactive materials generally provide sufficiently energetic beta and gamma radiation to effect the desired stabilization, and in addition, commercial electron beam sources such as for example, linear accelerators, Van de Graff generators and the like may also be utilized. However, the more penetrating electromagnetic radiation is more advantageous as a source of energy. Thus, pure actiivated isotopes such as, for example, cobalt–60 having a half life of 5.3 years and separated fission products such as, for example, cesium–137 having a half life of 33 years, provide excellent sources of radiation. Other forms of electromagnetic radiation, such as X-rays can also be utilized. In the case of X-rays, since the energy of the rays can be regulated by controlling the speed of the electrons, X-rays provide a convenient and effective control of both dosage and distribution of dose. Thus, it should be readily apparent that gamma and/or X-rays of different energies could be used, as well as radiation sources of varying intensity.

In carrying out my invention, in one illustrative example, substantially anhydrous liquid sulfur trioxide was obtained by the distillation of 20% oleum and condensation at a temperature of 40° C. No further drying was attempted. This unstabilized sulfur trioxide polymerized completely to a solid white asbestos-like mass at room temperature after storage for several hours.

The freshly distilled substantially anhydrous liquid sulfur trioxide thus prepared was introduced into individual glass tubes or containers. The usual precautions were taken in order to keep exposure to air and moisture to a minimum while the tubes were sealed with an oxygen torch. The tubes of the freshly distilled liquid sulfur trioxide were inserted into an irradiator 12 and subjected to radiation at a dose rate of $1.4 \times 10^6$ rad./hour for varying lengths of time. After exposure to the radiation for the desired period, the tubes were then frozen in an ice bath and remelted at room temperature. While a comparison sample of the liquid sulfur trioxide which was not subjected to radiation formed a 100% polymer at room temperature in a few hours, the irradiated samples of substantially anhydrous liquid sulfur trioxide were found to be completely stabilized, and were substantially free from polymerization. The percent of polymer formed after thirty minutes of treatment was less than 1% and after 24 hours was only 0.1%. The treated material did not freeze or polymerize at room temperature, and after freezing in an ice bath, the treated material was remelted at room temperature and retained its stabilized state.

The following table shows the percent of polymer formed after subjecting the prepared samples of substantially anhydrous liquid sulfur trioxide to radiation at a dose rate of $1.4 \times 10^6$ rad./hour for varying lengths of time.

TABLE I

| Time of radiation: | Percent polymer after freezing in cracked ice and remelting at 25° C. |
| --- | --- |
| 1 minute | 80.0 |
| 5 minutes | 80.0 |
| 15 minutes | <80.0 |
| 30 minutes | <1.0 |
| 1 hour | 0.4 |
| 1 hour | 0.3 |
| 2 hours | 0.2 |
| 3 hours | 0.2 |
| 24 hours | 0.1 |

The samples treated for 1 and 5 minute periods solidified on cooling in ice water and remelted at room temperature with only 80 percent polymer formation. The samples treated for 15 minute periods remelted at room temperature with less polymer formation, while the thirty minute samples showed less than 1.0 percent polymer after remelting.

FIG. 2 is a plot of the data listed in Table 1 and clearly illustrates the effect of increased time of irradiation. As shown in FIG. 2, the percent of polymer after freezing in cracked ice and remelting at 25° C. rapidly decreases so that stabilization is effected within the first half hour of irradiation. Further irradiation provides only a gradual reduction in the percent of polymer.

The radiation source used to gain the data of the preceding table was a 12,000 curie cesium–137 ($C_s^{137}$) research irradiator of the Notre Dame type. The does rate used was $1.4 \times 10^6$ rad./hour. The tubes of substantially anhydrous sulfur trioxide prepared as hereinbefore described, were loaded into brass capsules, lowered into the $C_s^{137}$ irradiator and treated by radiation for varying lengths of time.

The Notre Dame type research irradiator is well-known in the art being described in the article by Messrs. Palmer and Carter entitled A High Intensity Cesium–137 Research Irradiator; International Journal of Applied Radiation and Isotopes, 1960, volume 9, pp. 123–124. Such an irradiator comprises an intermediate tube nest for confining the radioactive material consisting of a circular array of brass tubes such that the source of active material can be positioned at each 30° interval around the center point.

In one particular form of irradiator, 12 sources of $C_s^{137}$ are provided, approximately 1000 curie each, in the form of CsCl, of specific activity in the range of 17–21 c./g. The sources are one-half inch in diameter by 12 inches in length (active material length of 6 inches). Surrounding the intermediate tube nest is an outer nest of brass tubes adapted to receive the samples which can be exposed in any one of the tubes to a homogeneous radiation field of $1 \times 10^6$ rad./hour. Each outer tube is displaced approximately 15° with relation to its adjacent tubes of the intermediate tube nest. Centrally disposed within the intermediate nest of tubes is a single brass storage tube or sample hole. A sample lowered in the center storage tube will be exposed to a radiation field of $1.4 \times 10^6$ rad./hour There has thus been described a novel method for the stabilization of liquid sulfur trioxide; however, it will be obvious to those skilled in the art that the inventive concept of the present invention is capable of a variety of modifications. It is, therefore, intended by the appended claims to cover all such modifications which come within the true spirit and scope of the invention.

What is claimed is:

1. The method of treating sulfur trioxide comprising irradiating substantially anhydrous liquid sulfur trioxide by subjecting said liquid sulfur trioxide for a predetermined period of time to high energy radiation of a sufficient intensity to effect stabilization of said liquid sulfur trioxide.

2. The method of treating sulfur trioxide as set forth in claim 1 wherein said period of time is in the range of approximately 15 minutes to 24 hours.

3. The method of treating sulfur trioxide as set forth in claim 1 wherein said period of time is at least 15 minutes.

4. The method of treating sulfur trioxide as set forth in claim 1 wherein said radiation is in the form of radioactive energy from an activated isotope.

5. The method of treating sulfur trioxide as set forth in claim 1 wherein said high energy radiation is in the form of gamma rays.

6. The method of treating sulfur trioxide comprising irradiating substantially anhydrous liquid sulfur trioxide by subjecting said liquid sulfur trioxide for a predetermined period of time to high energy radiation of an intensity sufficient to establish a dose rate greater than approximately $1 \times 10^6$ rad/hour to effect stabilization of said liquid sulfur trioxide.

7. The method of treating sulfur trioxide as set forth in claim 6 wherein said period of time is at least 15 minutes.

8. The method of treating sulfur trioxide comprising irradiating substantially anhydrous liquid sulfur trioxide by subjecting said liquid sulfur trioxide for a predetermined period of time to high energy radiation of a radioactive source and of an intensity sufficient to establish a dose rate greater than approximately $1 \times 10^6$ rad/hour to effect stabilization of said liquid sulfur trioxide.

9. The method of treating sulfur trioxide as set forth in claim 8 wherein said period of time is at least 15 minutes.

10. The method of treating sulfur trioxide comprising the steps of preparing unstable liquid sulfur trioxide, condensing the distillation product at a temperature of approximately 40° C., and subjecting the condensation products for a predetermined period of time to high energy radiation of a sufficient intensity to effect stabilization of said condensation product.

11. The method of treating sulfur trioxide as set forth in claim 10 wherein said period of time is in the range of approximately 15 minutes to 24 hours.

12. The method of treating sulfur trioxide as set forth in claim 10 wherein said period of time is at least 15 minutes.

13. The method as set forth in claim 10 wherein said high energy radiation is of an intensity sufficient to establish a dose rate greater than approximately $1 \times 10^6$ rad/hour.

14. The method of treating sulfur trioxide as set forth in claim 10 wherein said radiation is from a radioactive source.

15. The method of treating sulfur trioxide as set forth in claim 14 wherein said radioactive source is Cesium–137.

16. The method of treating sulfur trioxide as set forth in claim 14 wherein said radioactive source is Cobalt–60.

References Cited

UNITED STATES PATENTS 3,256,063  6/1966  Kane _____ 23—174

FOREIGN PATENTS 2,658,857  2/1927  Great Britain.

OTHER REFERENCES

Martin, "Chemical and Engineering News," vol. 33, No. 14 (April 1955), p. 1426.

HOWARD S. WILLIAMS, *Primary Examiner.*